Aug. 22, 1950     B. F. REYNOLDS     2,519,851
FISHING TACKLE
Filed Oct. 15, 1948
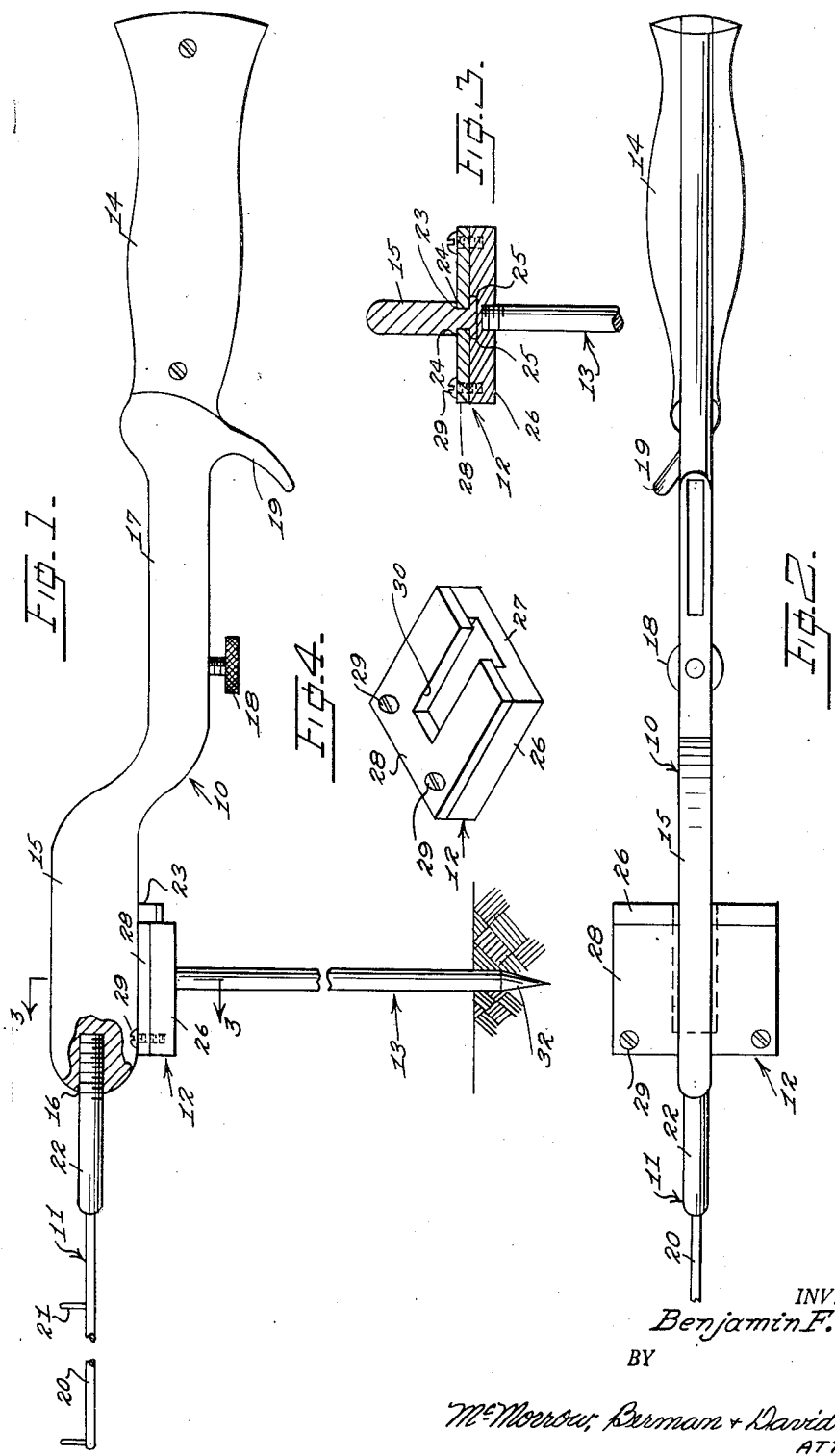
INVENTOR.
Benjamin F. Reynolds
BY
McMorrow, Berman & Davidson
ATTORNEYS Patented Aug. 22, 1950

2,519,851

UNITED STATES PATENT OFFICE 2,519,851

FISHING TACKLE

Benjamin F. Reynolds, Kansas City, Mo.

Application October 15, 1948, Serial No. 54,691

2 Claims. (Cl. 248—42)

This invention relates to improvements in fishing tackle, and more particularly to an improved fishing rod usable for either casting or still fishing, and a rod support for use in still fishing.

It is among the objects of the invention to provide an improved fishing rod and rod support assembly wherein the rod provides a comfortable hand grip for casting and means engageable with a separable support for supporting the rod independently on the ground or other base, such as a dock or pier, and can be disassembled for storage in a conventional tackle box, wherein the support is firmly engageable with the rod and with the ground or other base and can be disassembled for convenient and easy storage in a tackle box, and which rod and support assembly is simple and durable in construction, economical to manufacture, and neat and attractive in appearance.

Other objects and advantages will become apparent from a consideration of the following description and the appended claims in conjunction with the accompanying drawing, wherein:

Figure 1 is a side elevation of a fishing rod and support assembly illustrative of the invention, a portion of the rod being broken away and shown in cross section to better illustrate the construction thereof;

Figure 2 is a top plan view of the rod and support assembly illustrated in Figure 1;

Figure 3 is a transverse cross section taken substantially on the line 3—3 of Figure 1; and Figure 4 is a perspective view of a support block constituting an operative component of the assembly.

With continued reference to the drawing, the rod portion of the assembly comprises, in general, a shank 10 and a flexible staff 11, and a support comprises a support block 12 and a pin 13.

The shank 10 has a hand grip 14 at one end, preferably covered with cork or some similar material to provide a comfortable grip, an offset socket 15 at the opposite end which socket is provided in its outer end with a longitudinally extending, centrally disposed well 16 provided with internal screw threads. A reel seat 17 is disposed between the offset socket 15 and the hand grip 14 and is provided with a transverse, screw-threaded aperture into which is threaded the reel tightening screw 18 and a finger grip 19 projects outwardly from the shank at the end of the reel seat 17 adjacent the hand grip 14. This finger grip is inclined downwardly and outwardly and also somewhat forwardly toward the right-hand side of the rod when the rod is operatively held in the right hand of the fisherman, as particularly illustrated in Figure 2, to provide a more comfortable grip.

The staff 11 comprises an elongated, flexible portion 20 having line guide eyes 21 secured thereon and an enlarged tang 22 at the butt end of the flexible portion 20 which tang is provided near its outer end with external screw threads threadable into the well 16 of the socket 15.

The shank 10 and the staff 11 are of generally the same length so that when the tang 22 is disassembled from the socket 15, the staff and shank can be placed side by side for convenient storage in a conventional tackle box.

A key 23 is formed on the underside of the socket 15 and extends longitudinally of the socket. Oppositely disposed, longitudinally extending grooves 24 provided in the side walls of the socket 15, as clearly illustrated in Figure 3, provide a construction in which the outer portion or bottom of the key is provided with oppositely disposed, longitudinally extending lateral flanges 25 for securing the support block 12 to the shank 10 of the rod.

The support block 12, as particularly illustrated in Figure 4, comprises a square body 26 of suitable material provided in one surface with a centrally disposed wide groove 27, which extends medially of one major surface of the body a distance somewhat less than the width of such surface. A square cover plate 28 is secured over the grooved major surface of the body 26 by suitable means such as the screws 29 and this cover plate is provided with a medially extending slot 30 having a width somewhat less than the width of the groove 27. As illustrated in Figure 3, the slot 30 has a width equal to the distance between the grooves 24 in the socket 15 and the groove 27 has a width equal to the width of the flanged outer portion of the key 23, so that the support block 12 is slidably engageable with the key on the socket of the shank 10. The body 26 is provided with a substantially centrally located, internally screw-threaded recess 31 which opens to the side of the block opposite plate 28 but terminates short of the groove 27.

The pin 13 is a straight member, preferably of circular cross-section having one end pointed, as indicated at 32, and external screw threads adjacent its opposite end threadable into the recess 31 to secure the pin to the support block to extend substantially perpendicularly from said block at the side of the latter opposite that in which the groove 27 is provided.

The shank 10, the staff 11, the support block 12 and the pin 13 are all preferably formed of suitable metal to provide a strong and rigid construction. The shank 10 is preferably formed of a light weight metal or alloy such as aluminum or magnesium, while the staff 11 is preferably formed of a tempered steel or bronze alloy providing maximum strength and flexibility while the pin 13 may be formed of a suitable hard steel or similar material. The support block 12 may be formed of either steel or an aluminum alloy as may be found convenient or desirable.

With the support block and pin detached, the rod may be used for casting in the conventional manner, and if the fisherman decides to change from casting to still fishing, he can quickly apply the support block and pin to the shank of the rod and insert the pointed end of the pin into the ground or other base to support the rod without the necessity of the rod being manually held.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What I claim:

1. A fishing rod and support assembly comprising a rod shank, a key formation on said rod shank near one end of said shank and extending longitudinally thereof, said key formation having flanges extending laterally from the opposite sides thereof at the edge of said key formation remote from said shank, a support block having in one side thereof an elongated groove opening at one end to an edge surface of said block and closed at its opposite end, the width of the bottom portion of said groove being substantially the same as the width of the flanged portion of said key formation and the width of the outer portion of said groove being less than the width of said bottom portion and substantially the same as the thickness of the portion of said key formation between said flanges and said shank whereby said key formation will slide into said groove to the closed end of the latter and will be closely received in said groove, and a pin secured at one end to said block and extending substantially perpendicularly from the latter at the side of said block opposite that in which said groove is provided.

2. A fishing rod and support assembly comprising a rod shank, a key formation on said rod shank near one end of said shank and extending longitudinally thereof, said key formation having thereon oppositely projecting lateral flanges extending longitudinally thereof and spaced from said shank, a support block having in one side thereof a groove having a width substantially equal to the width of the flanged portion of said key formation and a depth substantially equal to the thickness of said flanges, a plate on said one side of said block and secured to the latter, said plate having therein a slot substantially centered relative to the groove in said block and having a width substantially equal to the thickness of said key formation between said flanges and said shank, said groove and said slot together constituting a keyway in which said key formation is slidably received, and a pin secured at one end to said block and extending substantially perpendicularly from said block at the side of the latter opposite said plate.

BENJAMIN F. REYNOLDS.

REFERENCES CITED

The following references are of record in the file of this patent:

UNITED STATES PATENTS

| Number | Name | Date |
|---|---|---|
| 1,577,612 | Dees | Mar. 23, 1926 |
| 2,311,823 | Gaskill, Sr. | Feb. 23, 1943 |

FOREIGN PATENTS

| Number | Country | Date |
|---|---|---|
| 351,379 | France | May 5, 1905 |
| 202,193 | Switzerland | Jan. 15, 1939 |
| 68,275 | Norway | Sept. 4, 1944 |